United States Patent
Nascimento et al.

(10) Patent No.: US 12,121,865 B2
(45) Date of Patent: Oct. 22, 2024

(54) MEMBRANES IN THE FORM OF HOLLOW FIBERS FOR THE SEPARATION OF $CO_2$ FROM NATURAL GAS AND METHOD OF PREPARATION BY HEAT TREATMENT AND DEVELOPMENT OF A POLYMERIC MEMBRANE PRECURSOR

(71) Applicants: PETRÓLEO BRASILEIRO S.A.-PETROBRAS, Rio de Janeiro (BR); UNIVERSIDADE FEDERAL DO RIO DE JANEIRO—UFRJ, Rio de Janeiro (BR)

(72) Inventors: Jailton Ferreira Do Nascimento, Rio de Janeiro (BR); Cristina Cardoso Pereira, Rio de Janeiro (BR); Wilson Mantovani Grava, Rio de Janeiro (BR); Cristiano Piacsek Borges, Rio de Janeiro (BR)

(73) Assignees: PETRÓLEO BRASILEIRO S.A.—PETROBRAS, Rio de Janeiro (BR); UNIVERSIDADE FEDERAL DO RIO DE JANEIRO - UFRJ, Rio de Janeiro (BR)

( * ) Notice: Subject to any disclaimer, the term of this patent is extended or adjusted under 35 U.S.C. 154(b) by 190 days.

(21) Appl. No.: 17/105,284

(22) Filed: Nov. 25, 2020

(65) Prior Publication Data
US 2021/0154620 A1     May 27, 2021

(30) Foreign Application Priority Data
Nov. 26, 2019  (BR) ...................... 10 2019 024939 0

(51) Int. Cl.
*B01D 67/00* (2006.01)
*B01D 69/08* (2006.01)
(Continued)

(52) U.S. Cl.
CPC ..... *B01D 67/0013* (2013.01); *B01D 67/0009* (2013.01); *B01D 67/00165* (2022.08);
(Continued)

(58) Field of Classification Search
CPC ......................... B01D 67/0083; B01D 69/088
See application file for complete search history.

(56) References Cited

U.S. PATENT DOCUMENTS 4,818,452 A * 4/1989 Kneifel ................. B01D 71/64
210/500.39
5,795,920 A * 8/1998 Kang ................. B01D 67/0011
521/64

(Continued)

*Primary Examiner* — Bradley R Spies
*Assistant Examiner* — Jeannie McDermott
(74) *Attorney, Agent, or Firm* — ARENTFOX SCHIFF LLP

(57) ABSTRACT

The present invention deals with a method for obtaining membranes in the form of hollow fibers with application in the field of carbon dioxide removal from natural gas. The aforementioned membranes are obtained by means of heat treatment of polymeric membranes. In this method, polymeric membranes are obtained by a phase-inversion technique by immersion-precipitation and are subsequently subjected to a heat treatment, that is, that the membranes effectively become precursor membranes of the heat treatment. The heat treatment process involves the optimization of the heating rate, temperature, and stabilization time variables, aiming at the improvement of the transport properties of the polymeric membranes. After the heat treatment, it becomes possible to use the membranes in separation processes of gases which operate at pressures greater than 30 bar, with selectivity for carbon dioxide ($CO_2$).

13 Claims, 2 Drawing Sheets

(51) Int. Cl.
   *B01D 71/42*   (2006.01)
   *B01D 71/64*   (2006.01)
   *B01D 71/68*   (2006.01)

(52) U.S. Cl.
   CPC ..... *B01D 67/0083* (2013.01); *B01D 67/0095* (2013.01); *B01D 69/087* (2013.01); *B01D 71/421* (2022.08); *B01D 71/643* (2022.08); *B01D 71/68* (2013.01); *B01D 2323/081* (2022.08); *B01D 2323/12* (2013.01); *B01D 2323/21* (2013.01)

(56) References Cited

U.S. PATENT DOCUMENTS

| | | | |
|---|---|---|---|
| 2008/0000350 A1* | 1/2008 | Mundschau | B01D 53/226 95/55 |
| 2008/0000828 A1* | 1/2008 | Wechs | B01D 71/68 264/515 |
| 2008/0152865 A1* | 6/2008 | Takeno | B01D 71/64 427/244 |
| 2010/0101410 A1* | 4/2010 | Prasad | C01B 3/505 95/53 |
| 2010/0129284 A1* | 5/2010 | Niitsuma | C01B 3/382 423/437.1 |
| 2010/0190965 A1* | 7/2010 | Yamaguchi | B01D 71/40 210/96.2 |
| 2014/0137735 A1* | 5/2014 | Bhandari | B01D 53/228 95/55 |

* cited by examiner

MEMBRANES IN THE FORM OF HOLLOW FIBERS FOR THE SEPARATION OF $CO_2$ FROM NATURAL GAS AND METHOD OF PREPARATION BY HEAT TREATMENT AND DEVELOPMENT OF A POLYMERIC MEMBRANE PRECURSOR

CROSS-REFERENCE TO RELATED APPLICATIONS

This patent application claims foreign priority to BR Patent Application No. 10 2019 024939 0, filed on Nov. 26, 2019, the disclosures of which are hereby incorporated by reference in their entireties.

TECHNICAL FIELD

The present invention relates to a method for obtaining membranes in the form of hollow fibers with application in the field of carbon dioxide removal from natural gas. The aforementioned membranes are obtained via heat treatment of polymeric membranes. In this method, polymeric membranes are obtained by a phase-inversion technique by immersion-precipitation and subsequent subjection to a heat treatment, i.e., they become precursor membranes of the heat treatment. The heat treatment process involves the optimization of the heating rate, temperature, and stabilization time variables, aiming at the improvement of the transport properties of the polymeric membranes. After the heat treatment, it becomes possible to use the membranes in separation processes of gases which operate at pressures greater than 30 bar, with selectivity for carbon dioxide ($CO_2$).

BACKGROUND

The composition of raw natural gas (NG) varies substantially depending on its origin. Normally, the component present in greatest abundance is methane, typically accounting for 75-90% of the total. In regard to the other components, it should be noted that natural gas contains significant portions of ethane, propane, butane, approximately 1-3% of other longer-chain hydrocarbons, and other substances such as water, hydrogen sulfide gas ($H_2S$), and carbon dioxide ($CO_2$).

The hydrogen sulfide gas, sulfur compounds, and carbon dioxide ($CO_2$) cause corrosion in pipelines, which impairs the transport and utilization of natural gas. Further, carbon dioxide reduces the calorific value of natural gas, reducing its energy efficiency.

In this context, when used in tertiary oil recovery, the carbon dioxide concentration is increased in natural gas, which makes recovery of carbon dioxide ($CO_2$) essential for subsequent re-injection.

Due to the importance of carbon dioxide ($CO_2$) removal from natural gas, numerous processes are suggested in the prior art, among which the following can be cited: (i) absorption with amines; (ii) cryogenics.

However, the aforementioned processes, although widely used and commercially available, have a number of disadvantages, such as high cost and complex operation. With regard to conventional amine absorption processes (bubble column), it should be noted that there are certain problems, including minimization of the size of the bubbles in the disperse phase, the maximization of the quantity of bubbles, and the fact that the systems require large available platform volumes for their implementation.

The removal of $CO_2$ can also be realized through gas permeation processes based on polymeric membranes. The membranes usually employed in gas separation processes have anisotropic morphologies with a dense, integral, or composite skin. Such structures aim for a higher separation efficiency.

The aforementioned gas separation depends on the affinity of the components for the polymeric material and the mobility of the components in the polymeric matrix. In this separation mechanism, the driving force is the difference in partial pressure between the supply side and the permeate side of the membrane.

Thus, in the gas permeation process, the aforementioned permeation occurs via a sorption and diffusion mechanism, in which the components with higher physical-chemical affinity for the membrane material will solubilize preferentially on the high-pressure side, diffusing through the polymeric matrix and desorbing on the lower-pressure side.

Regarding the selection of materials for the preparation of membranes, in addition to their physical-chemical properties, materials are sought with mechanical and thermal resistance with specificity for the permeation of a certain component.

In this way, the membrane separation process (MSP) is considered highly advantageous when compared to the processes available in the prior art such as the cryogenic process, given that MSPs are characterized by low energy consumption since they occur with no phase change required. The use of membranes also facilitates the determination of the interfacial contact area, which is known and constant, leading to better control and execution of the process. This is an advantage over the bubble column process, which depends on the size and quantity of bubbles and the operating conditions, which make control more difficult.

Among other advantages associated with the use of membranes in these processes, the following stand out: the possibility of utilizing materials capable of discriminating molecules with extreme efficiency; and the ease of scale expansion, since MSPs are modular, also allowing for different possible arrangements of the modules.

In the case of membranes composed of elastomeric polymers, the solubility of the components controls the permeation process, favoring the permeation of carbon dioxide ($CO_2$) relative to permanent low molar mass gases, such as hydrogen.

In regard to glassy polymers, such as cellulose acetate and polyimides, it should be noted that they are widely utilized in the separation of $CO_2$, $CH_4$, CO, $N_2$, and other hydrocarbons.

Thus, owing to the preferential permeability of carbon dioxide and hydrogen sulfide, the membrane-based gas permeation process is attractive for the treatment of natural gas, as it allows high removal without causing significant pressure losses in the processed stream. In addition, the process can be conducted by using the pressure of the natural gas stream available in production, without the need for compressors.

Another advantage associated with the membrane-based gas permeation process concerns the fact that it favors the use of offshore facilities, such as compact units, resulting in lower environmental impact.

Among the main methods of membrane preparation based on the phase inversion technique, the following stand out: (i) precipitation by controlled evaporation of the solvent; (ii) thermal precipitation; and (iii) immersion-precipitation. The preparation of anisotropic polymeric membranes is frequently realized with the phase inversion technique by immersion-precipitation. In this case, a polymer solution is immersed in a precipitation bath consisting of a non-solvent, or a solvent/non-solvent mixture, miscible in all proportions. In this way, the solvent diffuses into the precipitation bath and the non-solvent from the bath diffuses into the solution, leading to the precipitation of the polymer.

Thus, the technique typically used in the membrane-based gas permeation process refers to the preparation of integral anisotropic polymeric membranes prepared by the phase-inversion process, wherein phase separation is induced in a polymer solution via changes in its composition or temperature.

As a disadvantage of the use of polymeric membranes in the separation of gases, it should be considered that $CO_2$ promotes swelling of the polymer matrix and, consequently, the loss of selectivity and eventually of the mechanical properties of the membrane. Consequently, the present invention aims at the development of more resistant membranes that are capable of maintaining their transport and selectivity properties in the harshest operating conditions. Inorganic membranes present a superior mechanical resistance than polymeric ones, thereby constituting potential candidates for gas permeation. On the other hand, these membranes are subject to defects, in addition to their relatively higher production costs and much reduced gas permeability.

In the case of the preparation of membranes in the form of hollow fibers, during the extrusion of a polymeric film, a precipitation bath in the interior of the film, referred to as the internal liquid, is responsible for the precipitation front from the lumen of the extruded film. For this to occur, the internal liquid passes through a needle in the extruder while the polymer solution drains coaxially, so that after leaving the extruder, the polymeric solution immediately comes into contact with the internal liquid, initiating the mass transfer between the components of the internal liquid and the polymeric solution. Thus, the internal liquid allows the formation of the hollow polymeric film; i.e., it forms a membrane in the form of a hollow fiber.

The membranes subjected to heat treatment, as proposed in the present invention, can be prepared from membranes in the form of hollow fibers, which have the advantage of being self-supporting and which allow for a high packing density.

The use of integral anisotropic membranes for the gas permeation process is justified, among other reasons, by the fact that they are obtained in a single step; however, difficulties have been reported in the preparation of membranes with dense skins that are free from any imperfections.

A viable alternative is found in the case of anisotropic composite membranes, in which integral anisotropic membranes are used as a support upon which a thin layer is deposited that will form the skin. The mentioned coverage of the support can be carried out by various techniques, among which is the technique of covering by interfacial contact. Thus, in relation to the series resistance model proposed by HENNIS and TRIPODI, the overall resistance may tend to the value offered by the material that forms the skin or the support, depending on factors such as the surface porosity of the support, skin thickness, and the permeability and selectivity of the material that constitutes the skin and the support.

In the case of membranes to be used in gas separation processes, the support is frequently covered with an elastomeric polymer solution (e.g., polydimethylsiloxane), with the objective of covering surface pores and small defects in the support that reduce the selectivity. In this way, the permeability and selectivity of the membrane tend to the intrinsic values of the support, which is normally a glassy polymer more selective to gases.

Although it is possible to obtain a wide variety of morphologies by applying the phase-inversion technique by immersion-precipitation of polymer solutions, the utilization of these membranes becomes limited in the case of separation of condensable gases, such as carbon dioxide ($CO_2$), which promotes swelling of the polymer matrix and loss of selectivity.

As an alternative, inorganic membranes have higher values of mechanical and thermal resistance, being able to be used in more severe process conditions as compared to polymeric membranes. However, the high cost of inorganic membranes precludes their use.

Therefore, the preparation of membranes from more thermally and mechanically resistant materials makes such polymeric membranes more attractive, since these materials are designed to maintain their transport and selectivity properties under harsher operating conditions.

In order to fill this gap, the literature points to the preparation of carbon membranes. For the production of such carbon membranes, the precursor polymeric membranes are subjected to pyrolysis. The preparation of carbon membranes can be divided into three steps: (i) stabilization in an oxidizing atmosphere; (ii) carbonization in an inert atmosphere; and (iii) graphitization in an inert atmosphere.

In the stabilization step, oxidation occurs in the temperature range between 200 and 500° C., in which the thermoplastic polymer becomes a cyclic compound, which favors the formation of thermostable structures. In the second step, of carbonization, the crosslinking of the chains and dehydrogenation reactions take place, at temperatures of up to 1500° C., thereafter, at higher temperatures of up to 3000° C., graphitization occurs, promoting the increase in size and orientation of the crystals, which makes the membrane similar to graphite.

The proposal by BARBOSA-COUTINHO et al. underlines the fact that carbon membranes are obtained from polyetherimide (PEI)-based membranes as precursors which are subjected to high temperatures, reaching pyrolysis. The catalytic membranes are then prepared by the deposition of thin films by sputtering. In this context, advantages of mechanical resistance are conferred to the carbon membranes by altering the method of obtaining same, modifying the temperature and stabilization time.

The technique described still deals with the fact that carbonization favors the formation of a graphite-type structure, which leads to the formation of cracks on its external surface. Through analysis of the products released in the reactions involved in the pyrolysis of the fibers, especially the preferential release of hydrogen, it was concluded that the degradation reactions of the polymer chain are being minimized due to the stabilization promoted by the crosslinking reactions between the chains.

Another proposal described in the state of the art, in particular that by NASCIMENTO, 2014, suggests the preparation of a carbon membrane from a polymeric membrane in the form of PEI-based hollow fibers. This fact resulted in a polymeric and carbon-based membrane, free of imperfections and macrovoids, with high selectivity for hydrogen and high thermal resistance (600° C. in an oxidizing atmosphere and greater than 900° C. in an inert atmosphere). However, the aforementioned document does not deal with the removal of carbon dioxide ($CO_2$).

Thus, as explained, no prior art document discloses heat treatment conditions that favor the permeation and selectivity of hollow fibers, merely the consideration of the characteristic temperature range of the stabilization step. Thus, the present invention proposes a simpler and less costly method for removing carbon dioxide ($CO_2$) from natural gas streams.

SUMMARY

The present invention discloses a method of preparing polymeric membranes in the form of hollow fibers to be used as precursors for subsequently obtaining heat-treated hollow fibers.

The polymeric membranes, herein referred to as precursor membranes of the heat treatment, are obtained by the process of phase inversion by immersion-precipitation. The hollow fibers obtained by the aforementioned method are capable of selectively separating carbon dioxide from natural gas.

It should be noted that the heat treatment is carried out without reaching pyrolysis of the polymeric membranes, resulting in hollow fibers of lower cost when compared to inorganic or carbon membranes.

BRIEF DESCRIPTION OF THE DRAWINGS

The present invention will be described in more detail below, with reference to the attached figures, which, in a schematic and non-limiting manner in regard to the scope of the invention, represent examples of the execution of the invention. In the drawings.

DETAILED DESCRIPTION

Figure 1:
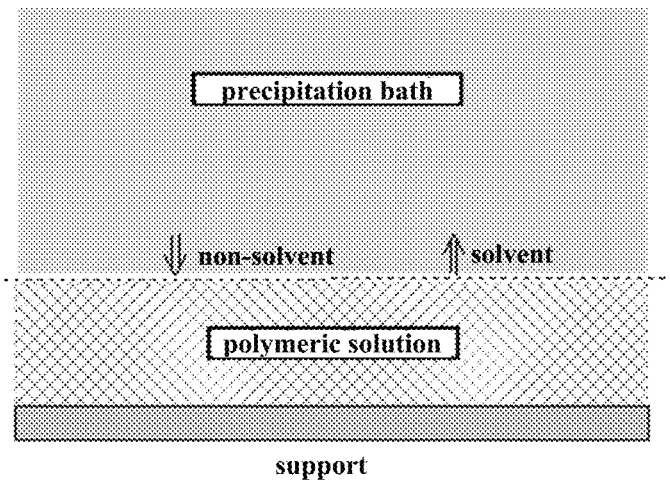
FIG. 1 illustrates the representation of the mass transfer between the solvent of the polymeric solution and the non-solvent of the precipitation bath.
Figure 2:
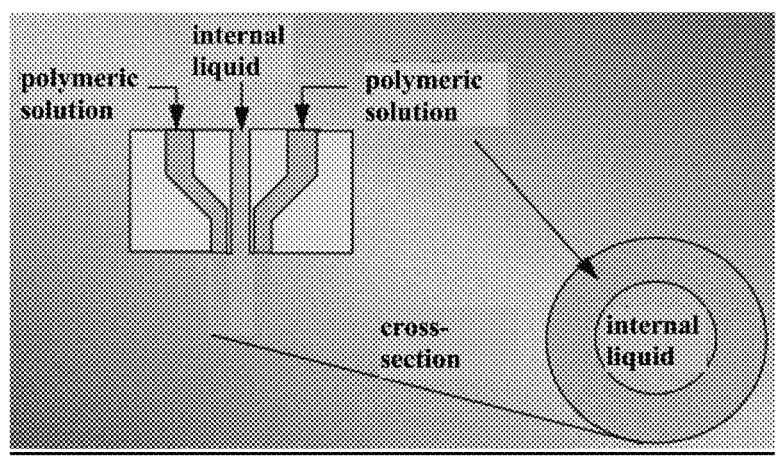
FIG. 2 illustrates the schematic representation of the interior of the extruder.
Figure 3:
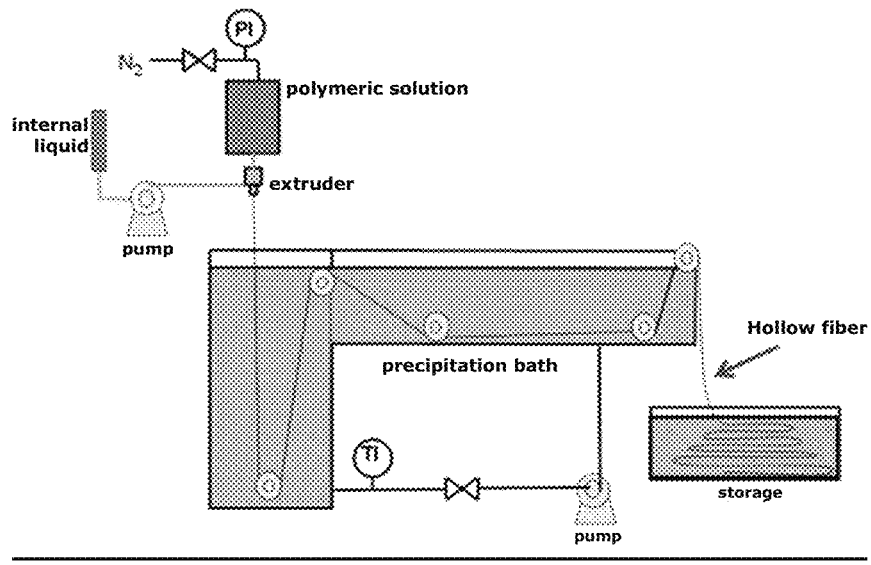
FIG. 3 illustrates the schematic representation of the spinning equipment.
Figure 4:
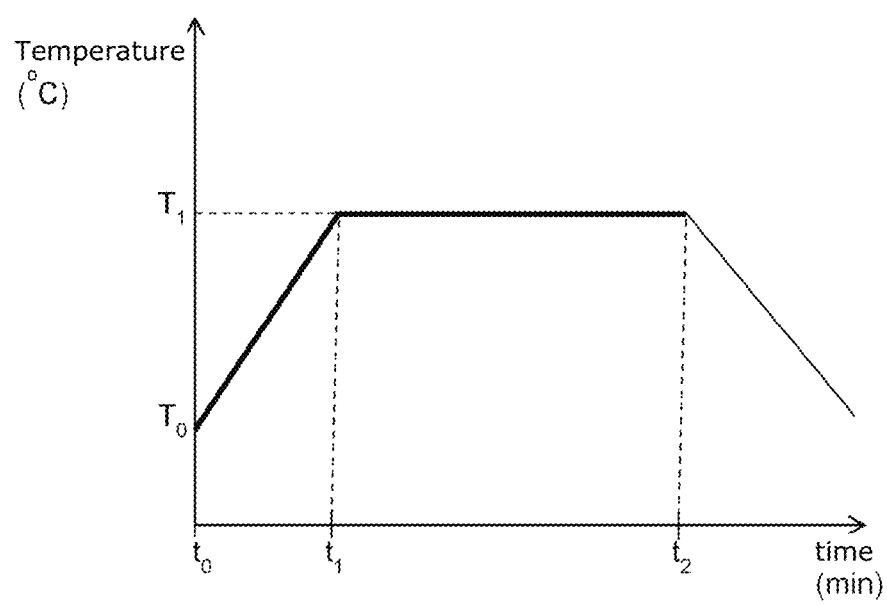
FIG. 4 illustrates the heat treatment of the polymeric hollow fibers investigated; heat-treatment time: t2-t1, stabilization time: T1 (maximum of 500° C.).

The present invention discloses the preparation of polymeric membranes in the form of hollow fibers, which consists of heat-treating the polymeric membranes, called precursors, under temperature conditions characteristic of the polymeric material stabilization step.

The polymeric membranes, referred to as precursor membranes of the heat treatment, are obtained by the process of phase inversion by immersion-precipitation. Thus, the method is carried out via the following steps:

a) the polymer solution is pressurized to the extruder;
b) the internal liquid is pumped to the extruder, wherein the distance between the extruder and the external precipitation bath (DEB) is varied;
c) the extruded polymeric film is exposed to the outside before immersion in the external precipitation bath, for a period of time which depends on the pre-defined DEB and the spinning speed;
d) while the extruded film is exposed to the outside, mass transfer occurs between the internal liquid and the polymeric solution, where the solvent of the solution diffuses into the internal liquid, while the non-solvent of the internal liquid diffuses into the polymeric solution, promoting an internal precipitation front. Simultaneously, mass transfer takes place between the polymeric solution and the external surroundings, where volatile solvent escapes to the outside and water vapor from the outside enters the polymeric solution, promoting an external precipitation front;
e) after immersion in the external precipitation bath consisting of microfiltered water, mass transfer occurs between the solvent of the polymeric solution and the external precipitation bath, thus becoming an external precipitation front. Simultaneously, the mass transfer between the internal liquid and the polymeric solution, as described in (d), continues;
f) due to the mass transfer processes described in (d) and (e), a phase separation occurs, leading to the precipitation of the polymer, and consequently the formation of the membrane in the form of hollow fibers;
g) after leaving the tank containing the external precipitation bath, the hollow fibers are collected and maintained at 60° C. in a water bath for 12 hours to remove residual solvent;
h) after the removal of residual solvent, the membranes are submitted to the drying step, in which the membranes are immersed in sequence in solvent baths 1 and 2, for a duration of 2 to 3 hours each, wherein solvent 1 in solvent bath 1 has less surface tension than water, and solvent 2 in solvent bath 2 has less surface tension than solvent 1. After the membranes are removed from solvent bath 2, they are exposed to the outside to allow the evaporation of solvent 2 contained in the pores of the membranes. After the membranes are dried, they can be used as precursor membranes for the heat treatment, which consists of heat-treating the polymeric membranes under temperature conditions characteristic of the polymeric material stabilization step, that is, without reaching pyrolysis of the polymeric material;

In the same way, the heat treatment of the precursor hollow fibers is carried out according to the following steps:

a) the precursor hollow fibers obtained by phase inversion are placed in an oven and subjected to a heating gradient of 22° C. (T0) to the temperature of the heat treatment (T1) (maximum 500° C.), which allows the membrane to stabilize;
b) after the stabilization temperature is reached, the hollow fibers are maintained at that temperature for a pre-defined period of time, referred to as the stabilization time;
c) after the heat treatment, the fibers are cooled to room temperature.

In a first aspect of the invention, it is emphasized that the polymeric solution consists of a polymer, an additive such as a macromolecule or low molar mass compound, and a solvent.

The polymer used in the aforementioned process is a thermally and mechanically resistant material, with polyimides, polyetherimide, polyethersulfone, and polyacrylonitrile, in which said polymer presents a polymeric solution with a maximum concentration of 15 to 30% w/w.

The additive consists of a low molar mass organic or inorganic compound, such as polyvinylpyrrolidone and polyethylene glycol, lithium nitrate, lithium chloride, glycerol, and colloidal silicon dioxide. This additive is used at a concentration of 0.5 to 15% w/w in the polymeric solution.

The solvent used in the proposed method is chosen from among compounds such as dimethylformamide, N-methyl-2-pyrrolidone, dimethylacetamide, dichloromethane, chloroform, tetrahydrofuran, and dimethylsulfoxide. The solvent is used at a concentration of 65 to 85% w/w in the polymer solution.

In another aspect, it should be noted that the distance between the extruder and the external precipitation bath (DEB) is varied, from zero to 10 cm, which allows for control of the duration of exposure of the polymeric film to the outside before immersion in the external precipitation bath, maintained at temperatures from 20 to 60° C.

The fiber then continues to a washing bath that allows for part of the solvent to be removed. After precipitation, the membrane remains in a water bath at 60° C. for 12 hours for the removal of residual solvent.

In yet another aspect of the invention, it is important to emphasize that the oxidizing atmosphere is the air flow and that the subsequent heating proceeds only to the polymeric material stabilization step, that is, without reaching the steps of carbonization and graphitization of the polymeric material.

In this aspect, it is explained that the hollow fibers are fixed to a stainless steel support, which is then inserted into the oven, approximately 50 cm in height and 3 cm in diameter, which has a temperature controller and a control valve for the entry of synthetic air, the flow of which is measured by a flowmeter.

In another aspect pertinent to the method of the present invention, it is also comprises an internal precipitation bath, called the internal liquid, and an external precipitation bath consisting of a non-solvent selected from water, methanol, ethanol, glycerol, and other pure non-solvents, or a mixture thereof as solvents consisting of n-methyl-2-pyrrolidone, dimethylsulfoxide, 1,2-dioxane, dimethylformamide, dimethylacetamide, and other organic solvents.

Still in this aspect, macromolecules can be added to the internal liquid, allowing its viscosity to be increased. Among the macromolecules added to the internal liquid, polyvinylpyrrolidone of molar masses in the range of 10,000 to 360,000 Da is selected, wherein the internal liquid is maintained at a temperature between 20 and 60° C.

It should also be noted that the heat treatment conditions disclosed in the present invention specify the heating rate and the stabilization time, wherein the maximum stabilization temperature of the method is 500° C., the heating rate is from 1 to 10° C./min, and the stabilization time in the heat treatment is from 30 to 90 minutes.

The preparation conditions disclosed in the present invention promote the formation of membranes obtained from polymeric materials and additives through a technique of known flexibility, namely, phase inversion by immersion-precipitation, in combination with mild conditions of the heat treatment, that is, without reaching pyrolysis of the polymeric membranes, resulting in hollow fibers of lower cost in comparison to inorganic or carbon membranes. The hollow fibers obtained by means of the present invention are capable of selectively separating carbon dioxide ($CO_2$) from natural gas, and have values of mechanical resistance greater than the precursor polymeric membranes.

EXAMPLES

Example 1

Preparation of hollow polymeric fibers for use as precursors in the heat treatment, aiming at the removal of carbon dioxide from natural gas. Hollow fibers obtained from the polymer solution of polyetherimide (PEI) at a concentration of 17% w/w (Ultem 1000), acquired from General Electric, and lithium nitrate ($LiNO_3$) acquired from Vetec and polyvinylpyrrolidone (PVP) acquired from Sigma-Aldrich as additives. N-methyl-2-pyrrolidone (NMP), acquired from Vetec, was utilized as solvent. The composition of the polymer solution utilized was PEI/$LiNO_3$/PVP/NMP=17/1/10/72 (% w/w). The composition of the internal liquid was water/NMP=30/70+10% PVP. Molar mass of PVP=360,000 Da. Temperatures of the polymer solution and the precipitation bath are 40 and 50° C., respectively. DEB is 6 cm. The hollow PEI fibers used as the precursor for the different heat-treatment conditions have pores along the cross-section and the upper surface. The porous sublayer, without macrovoids, is favorable to prevent the collapse of the fibers when subjected to high pressures. The hollow fibers were subjected to the heat treatment, varying the stabilization temperature from 200 to 400° C. The hollow fibers exhibited a reduction in the external diameter, due to the decrease in the porosity of the sublayer of the membrane. This result is favorable, as it promotes a higher packing density in the permeation module and prevents the collapse of the fiber at higher pressures. Results of the evaluation of mechanical resistance, performed using the INSTRON instrument, of the heat-treated hollow fibers in comparison to the polymeric hollow fiber precursor were identified. The results indicate that for a given applied force, the displacement is much greater for the untreated fiber in comparison to the fibers subjected to the heat treatment, indicating the higher resistance of the hollow fibers after the heat treatment.

Example 2

The heat-treated polymeric membranes are characterized by pure gas permeation tests conducted at room temperature, to obtain the permeability coefficient (P/e) and selectivity to pure gases (a).

The instrument used for measuring permeability consists of a stainless steel permeation cell for hollow fibers. A bubble flowmeter is used for the measurement of relatively high flows (>$10^{-4}$ cm/s). For lower permeate flows, a pressure transducer connected to a milliammeter can be used. The pressure gradient between the two sides of the transducer generates a signal that gets registered by the milliammeter, which is calibrated prior to the measurements, where each reading corresponds to a certain pressure on the permeated side. This allows for the reading of very low flows with high precision. In the case of changing gases, a vacuum pump (Edwards) is operated for 30 minutes to clean the system. The system uses as a model the $CO_2$/$N_2$ gas pair, which allows for the comparison with the $CO_2$/$CH_4$ gas pair given the similar behavior of the transport properties of both pairs of gases, maintaining a lower cost for the test due to the lower market value of nitrogen gas.

The permeability of carbon dioxide ($CO_2$) was 0.01 GPU and the selectivity for $CO_2$/$N_2$=33, for the heat treatment conditions involving a stabilization temperature=200° C., heating rate=10° C./min, and stabilization time=60 min. 1 GPU=$10^{-6}$ $cm^3$ (CNTP)/$cm^2$·s·cmHg.

The following examples are illustrative only and may be combined with aspects of other embodiments or teachings described herein, without limitation.

Example 1 is METHOD OF PREPARING POLYMERIC MEMBRANES IN THE FORM OF HOLLOW FIBERS, characterized by the fact that the polymeric membranes, referred to as precursor membranes of the heat treatment, are obtained by a process of phase inversion by immersion-precipitation, by means of the following steps: a polymeric solution is pressurized to an extruder; an internal liquid is pumped to the extruder, wherein the distance between the extruder and an external precipitation bath is varied, and referred to as the distance between the extruder and the external precipitation bath (DEB); an extruded polymeric film is exposed to an external environment before being immersed in the external precipitation bath, for a period of time which depends on the pre-defined DEB and a spinning speed; during an exposure of the extruded polymeric film to the external environment, mass transfer occurs between the internal liquid and the polymeric solution, wherein a solvent of the polymeric solution diffuses into the internal liquid, while a non-solvent of the internal liquid diffuses into the polymeric solution, promoting an internal precipitation front; simultaneously, mass transfer takes place between the polymeric solution and the external environment, wherein volatile solvent escapes to the external environment and water vapor from the external environment enters the polymeric solution, promoting an external precipitation front; after the immersion in the external precipitation bath comprising microfiltered water, mass transfer occurs between the solvent of the polymeric solution and the external precipitation bath, thus creating an external precipitation front; simultaneously, the mass transfer between the internal liquid and the polymeric solution, as described in (d), continues; due to the mass transfer processes described in (d) and (e), a phase separation occurs, leading to precipitation of a polymer of the polymeric solution, and consequently a formation of the membranes in the form of hollow fibers; after leaving a tank containing the external precipitation bath, the hollow fibers are collected and maintained at 60° C. in a water bath for 12 hours to remove residual solvent; after the removal of the residual solvent, the membranes are submitted to a drying step, in which the membranes are immersed in sequence into solvent baths 1 and 2, for a duration of 2 to 3 hours each, where solvent 1 in the solvent bath 1 has less surface tension than water, and solvent 2 in the solvent bath 2 has less surface tension than solvent 1; after the membranes are removed from the solvent bath 2, they are exposed to the external environment to allow evaporation of the solvent 2 contained in pores of the membranes; after the membranes are dried, they can be used as precursor membranes for the heat treatment, which comprises heat-treating the polymeric membranes under temperature conditions characteristic of a polymeric material stabilization step without reaching pyrolysis of polymeric material; precursor hollow fibers obtained in (h) are placed in an oven and subjected to a heating gradient of 22° C. (T0) to a temperature of the heat treatment (T1) (maximum 500° C.), which is referred to as a stabilization temperature; after the stabilization temperature is reached, the hollow fibers are maintained at that temperature for a pre-defined period of time, referred to as a stabilization time; after the heat treatment, the fibers are cooled to room temperature.

Example 2 is a METHOD, in accordance with Example 1, characterized by the preparation of a polymeric membrane in the form of hollow fibers as a precursor for the heat treatment, by the process of phase-inversion, by means of the immersion-precipitation and subsequent heat treatment at temperatures characteristic of the polymeric material stabilization step, that is, without reaching pyrolysis of the polymeric material.

Example 3 is a METHOD, in accordance with Example 1, characterized by the fact that the polymeric solution is utilized within a temperature range of 22 to 60° C. in the process of phase inversion by immersion-precipitation.

Example 4 is a METHOD, in accordance with Example 1, characterized by the fact that the polymeric solution comprises the polymer, macromolecular or low molar mass additives, and a solvent for the polymer.

Example 5 is a METHOD, in accordance with Example 1 or 4, characterized by the fact that the polymer utilized is a thermally and mechanically resistant material, such as polyimides, polyetherimide, polyethersulfone, or polyacrylonitrile.

Example 6 is a METHOD, in accordance with Example 1 or 5, characterized by the fact that the concentration of the polymer in the polymeric solution is between 15 and 30% w/w.

Example 7 is a METHOD, in accordance with Example 1 or 4, characterized by the fact that the polymeric solution has a non-solvent, referred to as an additive, such as an organic or inorganic macromolecule or low molar mass compound such as polyvinylpyrrolidone and polyethylene glycol, lithium nitrate, lithium chloride, glycerol, or colloidal silicon dioxide.

Example 8 is a METHOD, in accordance with Example 1 or 4 or 7, characterized by the fact that an additive is present in the polymeric solution at a concentration of 0.5 to 15% w/w.

Example 9 is a METHOD, in accordance with Example 1 or 4, characterized by the fact that the solvent utilized can be chosen from among compounds such as dimethylformamide, N-methyl-2-pyrrolidone, dimethylacetamide, dichloromethane, chloroform, tetrahydrofuran, and dimethylsulfoxide.

Example 10 is a METHOD, in accordance with Example 1 or 4 or 9, characterized by the fact that the concentration of the solvent in the polymeric solution is between 65 and 85% w/w.

Example 11 is a METHOD, in accordance with Example 1, characterized by the presence of the internal liquid and the external precipitation bath comprising a non-solvent or a mixture of solvent and non-solvent which is miscible in all proportions.

Example 12 is a METHOD, in accordance with Example 1, characterized by the promotion of the exposure of the extruded polymeric film to the external environment, after its extrusion, varying the distance between the extruder and the external precipitation bath (DEB) from zero (0) to 10 cm.

Example 13 is a METHOD, in accordance with Example 1, characterized by the presence of the internal liquid and the external precipitation bath composed of the non-solvent selected from among water, methanol, ethanol, glycerol, and other pure non-solvents or a mixture of them with solvents consisting of n-methyl-2-pyrrolidone, dimethylsulfoxide, 1,2-dioxane, dimethylformamide, dimethylacetamide, and other organic solvents.

Example 14 is a METHOD, in accordance with Example 1, characterized by the fact that macromolecules are added to the internal liquid, permitting an increase in its viscosity, and among the macromolecules added to the internal liquid, polyvinylpyrrolidone of molar mass in the range of 10,000 to 360,000 Da is selected.

Example 15 is a METHOD, in accordance with Example 1, characterized by the presence of the internal liquid and the external precipitation bath, each in the temperature range of 20 to 60° C.

Example 16 is a METHOD, in accordance with Example 1, characterized by the fact that after precipitation, a membrane remains in the water bath at 60° C. for 12 hours for the removal of the residual solvent.

Example 17 is a METHOD, in accordance with Example 1, characterized by the fact that after removal of the residual solvent, for the drying step, the membranes are immersed successively in baths of lower surface tension, such as ethanol followed by n-hexane.

Example 18 is a METHOD, in accordance with Example 1, characterized by the inclusion of the heat treatment of the polymeric membranes, referred to as precursors, at temperatures characteristic of the stabilization step of the polymeric material, that is, without reaching pyrolysis of the polymeric material.

Example 19 is a METHOD, in accordance with Example 1, characterized by the fact that the precursor hollow fibers are inserted into the oven which has a temperature controller and a control valve for the entry of synthetic air, the flow of which is controlled by a flowmeter.

Example 20 is a METHOD, in accordance with Example 1, characterized by the fact that, in the stabilization step, an oxidizing atmosphere is created by the flow of compressed air.

Example 21 is a METHOD, in accordance with Example 1, characterized by the fact that a maximum stabilization temperature of the precursor hollow fibers in the heat treatment is 500° C.

Example 22 is a METHOD, in accordance with Example 1, characterized by the fact that a heating rate is varied from 1 to 10° C./min in the heat treatment.

Example 23 is a METHOD, in accordance with Example 1, characterized by the fact that the stabilization time is varied from 30 to 90 minutes in the heat treatment.

Example 24 is a METHOD, in accordance with Example 1, characterized by the preparation of membranes in the form of hollow fibers capable of selectively separating carbon dioxide from natural gas.

Example 25 is MEMBRANES IN THE FORM OF HOLLOW FIBERS, obtained by the method defined in any of Examples 1 to 24, characterized by the fact that the membranes are capable of selective separation of carbon dioxide from natural gas.

Example 26 is MEMBRANES IN THE FORM OF HOLLOW FIBERS, in accordance with Example 25, characterized by the fact that the membranes result from the polymeric solution comprising the polymer, macromolecular or low molar mass additives, and a solvent for the polymer.

Example 27 is MEMBRANES IN THE FORM OF HOLLOW FIBERS, in accordance with Example 25 or 26, characterized by the fact that the polymer utilized in the polymeric solution is a thermally and mechanically resistant material, such as polyimides, polyetherimide, polyethersulfone, or polyacrylonitrile.

Example 28 is MEMBRANES IN THE FORM OF HOLLOW FIBERS, in accordance with Example 25 or 26, characterized by the fact that the concentration of the polymer in the polymeric solution is between 15 and 30% w/w.

Example 29 is MEMBRANES IN THE FORM OF HOLLOW FIBERS, in accordance with Example 25, characterized by the fact that the membranes result from the polymeric solution that includes a non-solvent, referred to as an additive, such as an organic or inorganic macromolecule or compound of low molar mass such as polyvinylpyrrolidone and polyethylene glycol, lithium nitrate, lithium chloride, glycerol, or colloidal silicon dioxide.

Example 30 is MEMBRANES IN THE FORM OF HOLLOW FIBERS, in accordance with Example 25 or 29, characterized by the fact that the membranes result from the polymeric solution that contains additives in a concentration of 0.5 to 15% w/w.

Example 31 is MEMBRANES IN THE FORM OF HOLLOW FIBERS, in accordance with Example 25, characterized by the fact that the polymeric solution includes a solvent selected from dimethylformamide, N-methyl-2-pyrrolidone, dimethylacetamide, dichloromethane, chloroform, tetrahydrofuran, and dimethylsulfoxide.

Example 32 is MEMBRANES IN THE FORM OF HOLLOW FIBERS, in accordance with Example 25 or 31, characterized by the fact that the concentration of the solvent in the polymeric solution is between 65 and 85% w/w.

Example 33 is MEMBRANES IN THE FORM OF HOLLOW FIBERS, in accordance with Example 25, characterized by the fact that the membranes demonstrate mechanical and thermal resistance and the capability to selectively separate $CO_2$ from natural gas.

What is claimed is:

1. A method of preparing polymeric membranes in the form of hollow fibers comprising:
   a) extruding a polymeric solution through an extruder, wherein the polymeric solution comprises:
      a polymer selected from polyamides, polyetherimide, polyethersulfone, polyacrylonitrile, or a mixture thereof;
      an additive selected from a macromolecule selected from polyvinylpyrrolidone or polyethylene glycol or a low molecular weight organic or inorganic compound selected from nitrate lithium chloride lithium chloride glycerol or colloidal silicon dioxide; and
      a solvent selected from dimethylformamide, N-methyl-2-pyrrolidone, dimethylacetamide, dichloromethane, chloroform, tetrahydrofuran, dimethylsulfoxide, or a mixture thereof;
   b) adding an internal liquid into the extruder, wherein distance between the extruder and an external precipitation bath (DEB) is a pre-defined distance and an extruded polymeric film is exposed to an external environment,
   wherein the internal liquid and the external precipitation bath comprises a non-solvent or a mixture or non-solvent and a solvent, wherein the non-solvent is selected from water, methanol, ethanol, glycerol, or a mixture of thereof; and the solvent selected from N-methyl-2-pyrrolidone (NMP), dimethylsulfoxide, 1,2-dioxane, dimethylformamide, dimethylacetamide, or a mixture thereof;
   c) immersing the extruded polymeric film into the external precipitation bath comprising microfiltered water, for a period of time depending on the pre-defined DEB and a spinning speed;
      wherein, during an exposure of the extruded polymeric film to the external environment, mass transfer occurs between the internal liquid and the polymeric solution, wherein a solvent of the polymeric solution diffuses into the internal liquid, while a non-solvent of the internal liquid diffuses into the polymeric solution, promoting an internal precipitation front; simultaneously, mass transfer takes place between the polymeric solution and the external environment, wherein volatile solvent escapes to the external environment and water vapor from the external environment enters the polymeric solution, promoting an external precipitation front;
      wherein, after the immersion in the external precipitation bath, mass transfer occurs between the solvent of the polymeric solution and the external precipitation bath, thus creating an external precipitation front; simultaneously, the mass transfer between the internal liquid and the polymeric solution continues; and
      wherein, due to the mass transfer processes, a phase separation occurs;

d) precipitating a polymer of the polymeric solution;
e) forming membranes in the form of hollow fibers;
f) collecting the hollow fibers;
g) removing residual solvent at 60° C.;
h) drying the membranes by the following steps:
   h1) immersing the membranes in sequence into solvent baths 1 and 2, for 2-3 hours each, wherein a solvent 1 in the solvent bath 1 has less surface tension than water, and a solvent 2 in the solvent bath 2 has less surface tension than solvent 1;
   h2) removing the membranes from the solvent bath 2;
   h3) exposing the membranes to allow evaporation of the solvent 2 contained in pores of the membranes to obtain precursor hollow fibers;
i) placing the precursor hollow fibers obtained in (h) in an oven and subjecting to a heating gradient from 22° C. (T0) to a temperature of the heat treatment (T1) which is set to maximum 500° C.,
wherein the s from 1 to 10° C./min;
j) keeping the hollow fibers at the stabilization temperature for a pre-defined period of time, which is a stabilization time,
wherein the stabilization time in the heat treatment is from 30 to 90 minutes; and
k) cooling the membranes to room temperature to produce polymeric membranes in the form of hollow fibers,
wherein the membranes is used for separation processes of carbon dioxide selectively at pressures greater than 30 bar.

2. The method of claim 1, wherein the stabilization temperature is a temperature without pyrolysis of the polymeric material.

3. The method of claim 1, wherein the temperature of the external bath is 22-60° C.

4. The method of claim 1, wherein the concentration of the polymer in the polymeric solution is 15-30% w/w.

5. The method of claim 1, wherein the concentration of the additive in the polymeric solution is 0.5-15% w/w.

6. The method of claim 1, wherein the concentration of the solvent in the polymeric solution is 65-85% w/w.

7. The method of claim 1, wherein the distance between the extruder and the external precipitation bath (DEB) is 0-10 cm.

8. The method of claim 1, wherein a macromolecule with a molar mass of 10,000-360,000 Da is added to the internal liquid to increase viscosity.

9. The method of claim 1, temperatures of the internal liquid and the external precipitation bath are each 20-60° C.

10. The method of claim 1, wherein the residual solvent is removed for 12 hours in step g).

11. The method of claim 1, wherein the solvent 1 is ethanol and the solvent 2 is n-hexane.

12. The method of claim 1, wherein the oven has a temperature controller and a control valve to control flow of synthetic air which is controlled by a flowmeter.

13. The method of claim 1, wherein the additive is glycerol, colloidal silicon dioxide or a mixture thereof.

* * * * *